UNITED STATES PATENT OFFICE.

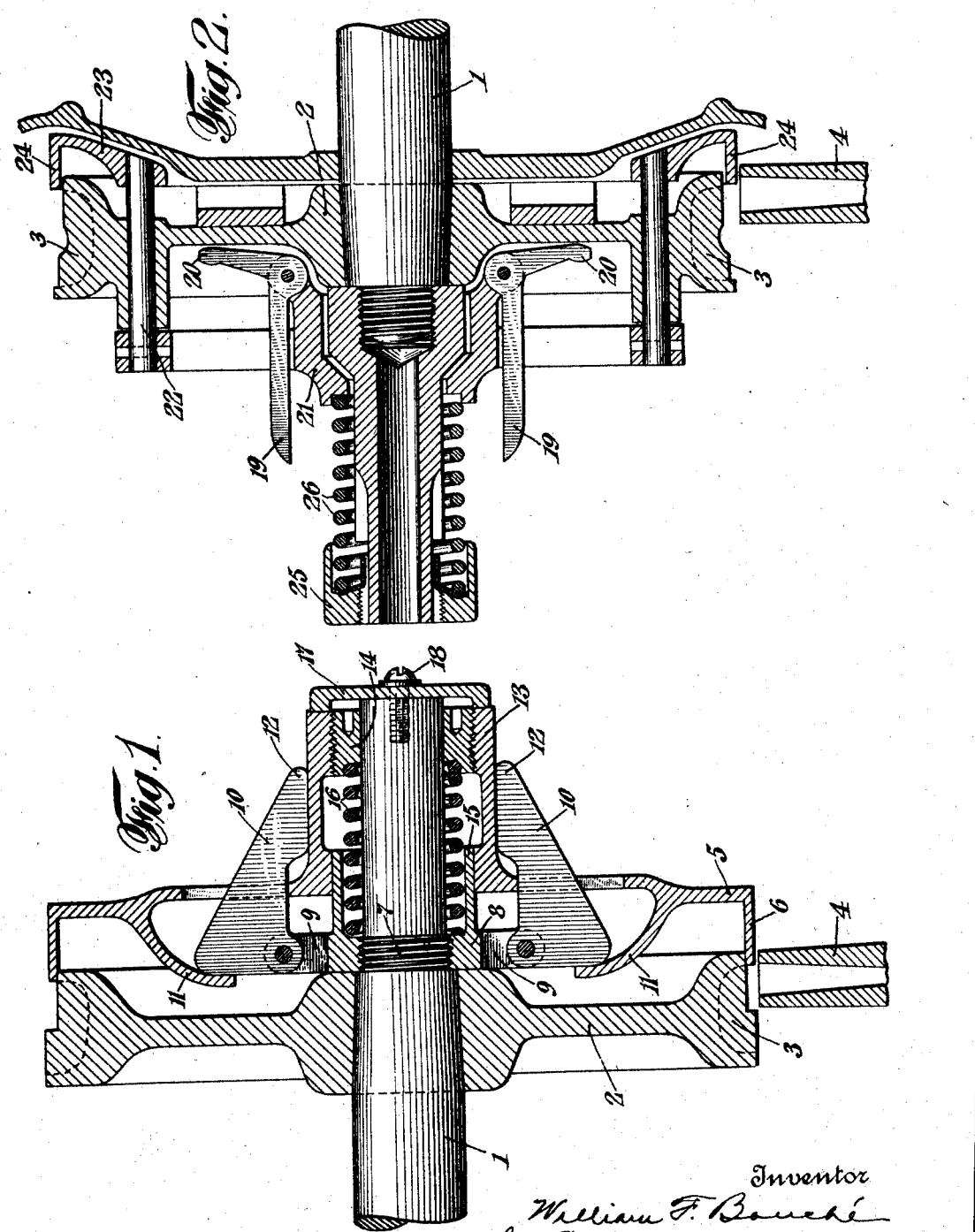

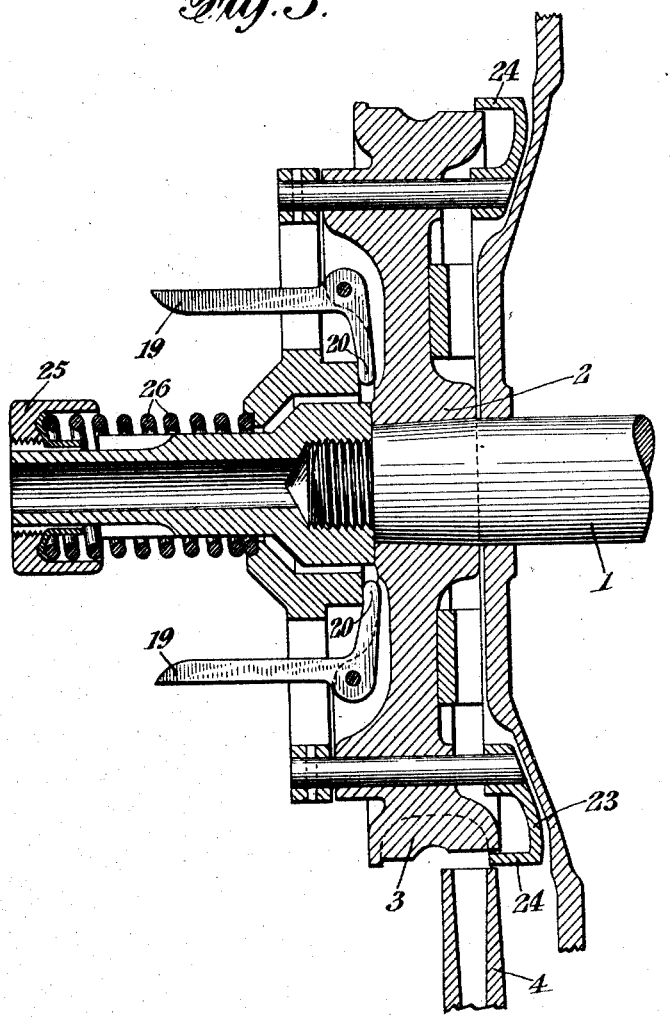

WILLIAM F. BOUCHÉ, OF LANCASTER, NEW YORK, ASSIGNOR TO GOULD COUPLER COMPANY, A CORPORATION OF NEW YORK.

GOVERNOR.

1,415,981.  Specification of Letters Patent.  Patented May 16, 1922.

Application filed February 28, 1920. Serial No. 362,153.

*To all whom it may concern:*

Be it known that I, WILLIAM F. BOUCHÉ, a citizen of the United States, and a resident of Lancaster, county of Erie, and State of New York, have invented certain new and useful Improvements in Governors, of which the following is a specification.

My invention relates to governors and particularly to governors for steam turbines.

An object of my invention is to construct a governor which will control the admission of steam to the turbine's runners in accordance with the speed of the turbine.

Another object of my invention is to produce a governor mechanism which is simple in construction and which eliminates all thrust blocks or other friction devices whereby the governor is made more dependable in action.

Other advantages will be apparent from reading the following specification taken in connection with the accompanying drawings forming a part hereof, and in which Fig. 1 is a sectional view of a preferred embodiment of my invention, Fig. 2 is a similar view of a modification thereof, and Fig. 3 is a similar view of a still further modification of my invention.

Referring to the drawings, the device comprises a shaft 1, a turbine runner 2, having suitable buckets 3 of any well known design thereon, a nozzle 4 for supplying steam or other motive fluid for propelling the runner, a member 5 mounted on the shaft 1, and having a portion 6 arranged to rim the circumference of the runner 2 and adapted to be moved into different positions between the nozzle 4 and the buckets 3. The shaft 1 in Fig. 1 is threaded at 7 and a nut 8 is screwed thereon and has projections 9, to which projections are pivotally connected centrifugal weights 10. One end of each of the weights 10 bears against a portion 11 of the member 5. Each of the members 10 has a portion 12 which when the shaft 1 is revolved is thrown outwardly, causing the member 10 to engage the portions 11 of the member 5 and move it to the left longitudinally of the shaft 1 as shown in Fig. 1. This movement depends upon the speed of the shaft 1.

The member 5 has a cylindrical portion 13 surrounding a portion of shaft 1. Screwed into the interior screw threaded portion of this extension 13 of the member 5 is a nut 14 which is slidable along the shaft 1. The nut 8 has a cylindrical portion 15 surrounding the shaft 1, and between the nut 14 and the nut 8 is arranged a coil spring 16, the same being inside the portion 15 of the nut 8 at one end. The nut 8 is fixed to and rotates with the shaft 1 and also acts as a lock nut for the turbine runner as well as for the hinge for the pivotal support of the members 10.

A cap member 17 is placed on the end of the shaft 1 and held thereon by means of a screw 18, which is threaded into the end of the shaft. The member 17 acts as a stop which limits the movement of the member 5 away from the runner 2.

In the modification shown in Fig. 2 the shaft 1, runner 2 and buckets 3 are the same as in Fig. 1 but the means for controlling the admission of steam to the buckets is somewhat different in detail. In this modification each of the centrifugal members 19 is provided with a portion 20 bearing against the runner 2. The members 19 are pivoted to a member 21 which carries at its outer portion a plurality of rods 22 which extends through openings in the runner 2 and carry a member 23 which has a portion 24 extending around the circumference of the runner 2 and which is adapted to be moved between the nozzle 4 and the buckets 3.

Screwed on to the end of the shaft 1 is a nut 25 which has a seat on the inside thereof to receive the end of the coil spring 26, the other end of which engages the member 21.

The modification shown in Fig. 3 is exactly the same as that of Fig. 2 in all respects except that the members 19, instead of being pivotally attached to the member 21 are pivotally attached to the runner 2 and each of them has a portion 20 which engages the member 21.

The operation of my device is as follows:

Referring to Fig. 1, steam is directed against the buckets 3 through the nozzle 4 and the shaft and all the other parts shown are rotated. When the speed of the shaft 1 reaches a predetermined amount, the ends 12 of the members 10 fly outwardly by reason of centrifugal action and the members 10 are rotated around their pivotal points. By reason of this rotation the portion 6 is moved to the left between the nozzle 4 and the buckets 3 in opposition to the spring 16. The amount of steam entering the buckets 3 is thereby reduced and the speed of the shaft 1 is accordingly reduced. As the speed is reduced slightly an opposite operation takes place thereby permitting more steam to enter the buckets 3. In this simple way the speed of the shaft 1 is maintained substantially constant and at a predetermined number of revolutions per minute so long as there is steam enough to propel the shaft at the desired speed under prevailing loads. The adjustment of the nut 14 determines the tension of the spring 16 and thereby the normal speed of the shaft 1. The outward movement of the member 5 is limited by one of two things. First, by the stop plate 17 and second, by the portion 11 engaging the members 10 and moving them so that their ends 12 engage the cylindrical portion 13 of the member 5.

The operation of the modifications shown in Figs. 2 and 3 is substantially the same as that shown in Fig. 1; that is to say, as the speed increases above a predetermined amount, the centrifugal members 19 fly outwardly, thus causing the member 21 to move to the left and carrying with it through the rods 22, portion 24 of the member 23, which moves in between the nozzle 4 and the buckets 3, this operation taking place in opposition to the spring 26.

Obviously, many other detailed arrangements may be devised for carrying out the idea expressed in the embodiments above shown and described, and in view of this fact I do not desire to be limited to the exact details shown and described, but only by the claims appended hereto.

Having described my invention, what I claim as new and desire to secure by Letters Patent is:

1. In a turbine the combination of a turbine runner and its shaft means for applying motive fluid to said runner to operate the same, an annular member movable relatively to the runner longitudinally of the shaft over the operative face of the runner to control the effect of the motive fluid thereon, pivotally mounted centrifugal means rotating with the runner and acting to move said member relatively over the operative face of the runner, said member having a frame work extending inwardly from its periphery and forming a part surrounding the axis of said shaft and between said axis and the pivotal points of said centrifugal means and a spring acting on said part to oppose the action of said centrifugal means.

2. In a turbine the combination of a turbine runner and its shaft, means for applying motive fluid to said runner to operate the same, an annular member movable relatively to the runner longitudinally of the shaft over the operative face of the runner to control and vary the effect of the motive fluid thereon, centrifugal means rotating with the runner and acting to move said member relatively over the operative face of the runner when the speed of the runner reaches a predetermined value, said member having inwardly extending means movable therewith against which said centrifugal means press to move said member, and a coil spring surrounding the axis of said shaft and acting to oppose the action of said centrifugal means, said spring acting against said inwardly extending means.

3. In a turbine the combination of a turbine runner and its shaft, means for applying motive fluid to said runner to operate the same, an annular member movable relatively to the runner longitudinally of the shaft over the operative face of the runner to control the effect of the motive fluid thereon, pivotally mounted centrifugal means rotating with the runner and acting to move said member relatively over the operative face of the runner, said member having a frame work extending inwardly from its periphery and forming a part surrounding the axis of said shaft and a coil spring surrounding the axis of said shaft and acting to oppose said centrifugal means.

4. In a turbine the combination of a turbine runner and its shaft, means for applying motive fluid to said runner to operate the same, an annular member movable longitudinally of the shaft over the operative face of the runner to control and vary the effect of the motive fluid thereon, centrifugal means rotating with the runner and acting to move said member over the operative face of the runner when the speed of the runner reaches a predetermined value and a coil spring surrounding the axis of said shaft and acting to oppose the action of said centrifugal means, said member having inwardly extending means movable therewith against which said spring thus acts, and means carried on the shaft and abutting one end of said spring for holding it in operative position.

5. In a turbine the combination of a turbine runner and its shaft, means for applying motive fluid to said runner to operate the same, an annular member movable longitudinally of the shaft over the operative face of the runner to control the effect of the motive fluid thereon, pivotally mounted centrifugal means rotating with the runner and acting to move said member over the operative face of the runner, said member having a frame work extending inwardly from its periphery and forming a part surrounding the axis of said shaft and a coil spring surrounding the axis of said shaft and abutting said part to oppose said centrifugal means, and means removably carried on the end of the shaft and abutting the other end of the spring for holding it in operative position.

In testimony whereof, I have signed my name to this specification.

WILLIAM F. BOUCHÉ.